United States Patent [19]
Chandler

[11] 3,885,074
[45] *May 20, 1975

[54] THERMOPLASTIC NET

[75] Inventor: Edmond A. Chandler, Northwood, N.H.

[73] Assignee: Breveteam S.A., Fribourg, Switzerland

[*] Notice: The portion of the term of this patent subsequent to Oct. 30, 1990, has been disclaimed.

[22] Filed: Sept. 6, 1973

[21] Appl. No.: 394,776

Related U.S. Application Data

[62] Division of Ser. No. 145,663, May 21, 1971, Pat. No. 3,769,120, which is a division of Ser. No. 733,576, May 31, 1968, Pat. No. 3,616,152.

[52] U.S. Cl. .................. 428/136; 156/84; 156/211; 264/164; 264/230; 264/342 R; 428/347; 428/200
[51] Int. Cl. ...... B32b 3/10; B65b 53/06; B29f 5/00
[58] Field of Search ...... 161/109, 112, 117, DIG. 6; 117/4, 37 R, 122 H; 156/84–86, 211, 291; 264/230, 164, 342 R

[56] References Cited
UNITED STATES PATENTS

| | | | |
|---|---|---|---|
| 3,065,785 | 11/1962 | Taber | 161/109 X |
| 3,092,439 | 6/1963 | Harrison | 264/230 X |
| 3,199,284 | 8/1965 | Scragg | 161/DIG. 6 |
| 3,441,638 | 4/1969 | Patchell et al. | 161/109 X |
| 3,474,952 | 10/1969 | Cover et al. | 161/109 X |

Primary Examiner—Harold Ansher
Attorney, Agent, or Firm—Kenyon & Kenyon Reilly Carr & Chapin

[57] ABSTRACT

This invention is concerned with a method of thermoplastic polymeric resin or resin adhesive deposition or adhesive bonding in which a thin film of thermoplastic resin with a special arrangement of slits or cuts is applied to a surface and heat is applied to bring the resin to heat-softened condition and cause the film to assume a pattern directly related to the arrangements of slits or cuts. The invention also relates to the open pattern resin or resin adhesive sheet resulting from heating of the cut or slit film.

2 Claims, 7 Drawing Figures

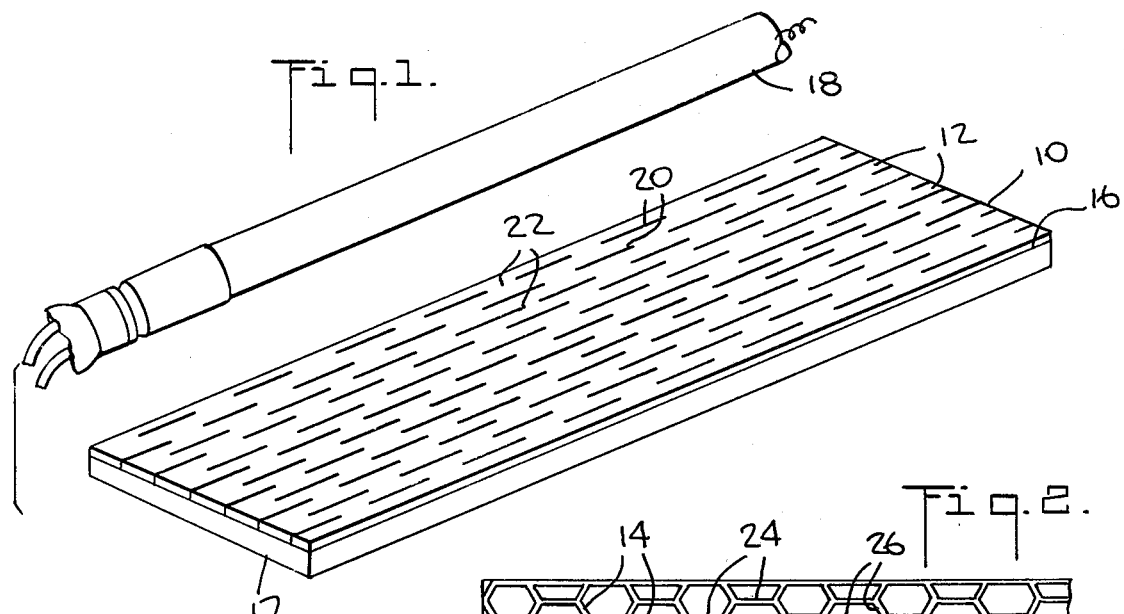
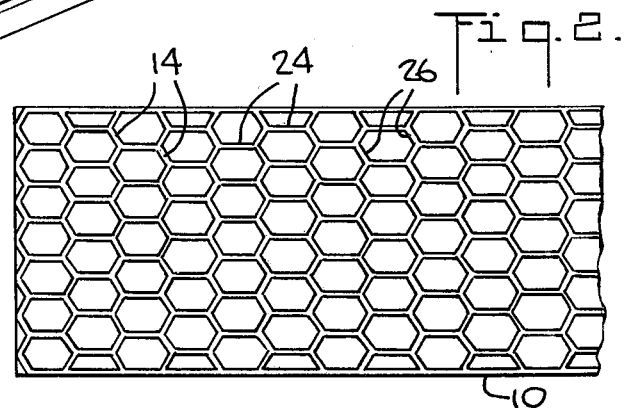
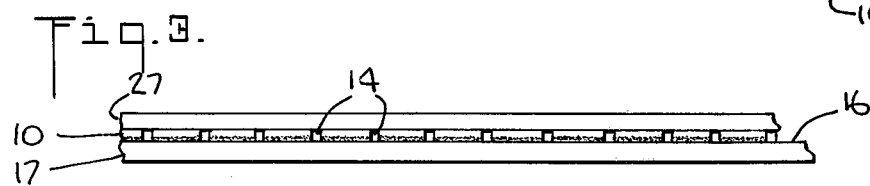
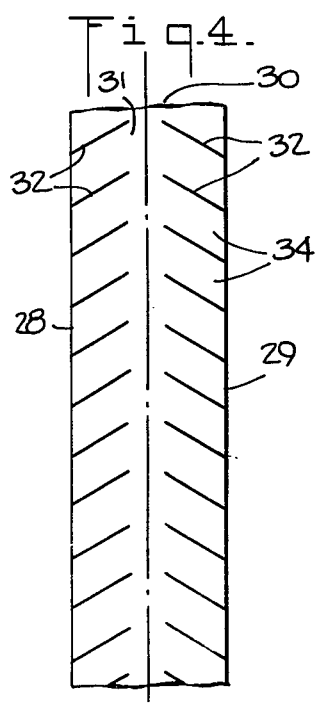
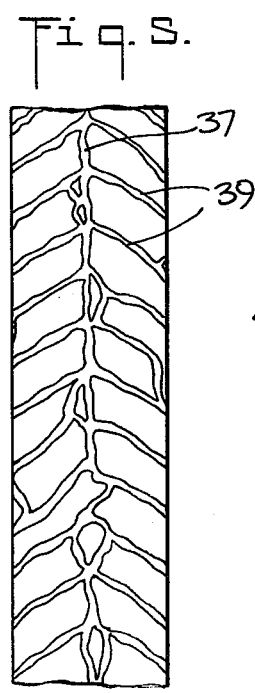
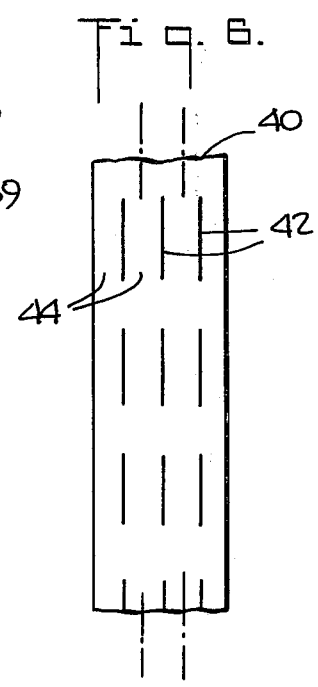
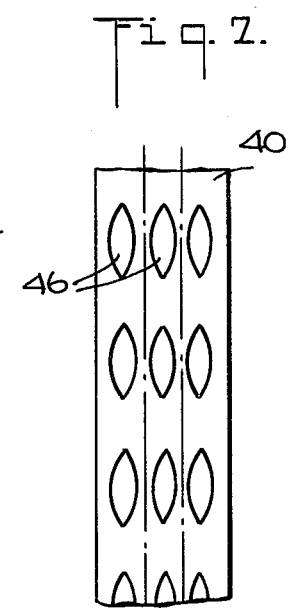

THERMOPLASTIC NET

CROSS REFERENCE TO RELATED APPLICATIONS

This is a divisional application of a parent application Ser. No. 145,663, filed May 21, 1971, now U.S. Pat. No. 3,769,120, which in turn is a division of parent application Ser. No. 733,576, filed May 31, 1968, now U.S. Pat. No. 3,616,152.

FIELD OF THE INVENTION

Adhesive processes for bonding articles, for example, for bonding outsoles to shoe uppers are known in which a band of thermoplastic synthetic polymeric resin adhesive is applied in molten form to one of the attaching surfaces and, at the time the attaching is to be completed, the adhesive band is reheated and assembled against the heated attaching surface of the shoe upper. Excellent bonds are obtained; but the process requires the separate steps of applying molten adhesive to the tread member to form an adhesive band and the further steps of reheating the adhesive and the surface which is to be placed against it. Also because of irregularities in the attaching surface, a band of adhesive of substantial thickness has been required.

Another procedure forming the subject of U.S. Pat. No. 3,483,581 entitled "Adhesive Processes," issued Dec. 16, 1969 in the names of Edmond A. Chandler and Kenelm W. Winslow, involves laying down a coherent adhesive sheet of thin interconnected strands of thermoplastic resin adhesive on a surface to be bonded and thereafter heating the adhesive sheet and both of the surfaces which are to be joined by the adhesive. This procedure is effective to form strong bonds rapidly using a minimum amount of adhesive, however, the making of a sheet composed of thin interconnected strands introduces an element of expense and imposes rather difficult problems in forming a sheet of the desired uniformity.

It is an object of the present invention to provide a method of resin deposition or adhesive bonding using an inexpensive, uniform resin or resin adhesive sheet or film to deposit resin or adhesive in a regular uniform open pattern. The heating step may be used to activate the adhesive when an adhesive film is used and to preheat the surface on which the adhesive sheet is disposed.

It is a further object of the present invention to provide an open pattern thermoplastic resin or resin adhesive sheet.

To these ends and in accordance with a feature of the present invention, a thin sheet or film of thermoplastic polymeric resin with spaced cuts or slits arranged to give a pattern of resin on heating is disposed on a surface and subjected to heat. The large surface area of the sheet or film is effective to absorb heat and when laid on a surface and subjected to heat is converted by that heat to a regular open pattern. Where the film is an adhesive, the opening of the sheet to form the open pattern exposes to heat substantial portions of the surface on which it was laid. After assembly and pressing of another surface against the heated adhesive and its associated surface, and cooling the assembly, a strong bond is obtained.

The invention will be described further in connection with the attached drawings forming part of the disclosure.

In the drawings,

FIG. 1 is an angular view of a film of polymer resin, which may be an adhesive, illustrative of one embodiment of the invention, disposed on a surface of a workpiece and showing a radiant heat source disposed to convert the film to an open pattern;

FIG. 2 is a plan view of the surface of the workpiece and the resin film after being heated to convert the film to an open pattern of resin film;

FIG. 3 is an elevational view of an assembly of a second workpiece with a workpiece carrying an open pattern of adhesive resin such as developed in FIG. 2;

FIG. 4 is a plan view of a second illustrative embodiment of the invention with cuts disposed in a different pattern in the resin film;

FIG. 5 is a plan view showing the pattern of resin developed by heating the resin film of FIG. 4;

FIG. 6 is a plan view of another embodiment of the invention with parallel rows of slits arranged with slits opposite slits and uncut portions opposite uncut portions in the resin film; and FIG. 7 is a plan view of the pattern of resin developed by heating the resin film of FIG. 6.

As shown in the drawings, see FIGS. 1, 4 and 6, the novel sheet 10 is a thin synthetic polymer resin film with spaced slits or cuts 12, 32 and 42, respectively, so arranged that when the film is softened by heat, the film draws in at the edges of the slits or cuts to form an open pattern such as intersecting lines or beads 14 (FIG. 2) of softened, usually molten resin extending approximately along the median lines of the portions of the film between slits or cuts 12. The pattern or configuration of the resin is determined by the size, spacing and relative position of the slits or cuts 12 in the initial adhesive film 10. Although only three arrangements are shown, a wide variety of patterns or configurations of resin can be provided by arranging the spacing and relative position of the slits or cuts.

According to the method of the present invention the thermoplastic resin sheet 10 is supported on the surface 16 of a workpiece 17 and subjected to heat to soften it and cause it to assume the desired open pattern such as an intersecting line configuration. Since movement of the resin under the action of heat is an important feature, the sheet 10 is not clamped tightly between surfaces, but it is generally preferred that it be merely supported on the surface 16 and subjected to a heat source 18 such as radiant heat or hot gases in order that the movement of the resin not be restrained.

The sheet or film 10 can also be reduced to the open pattern by heating it on a hot surface. While the supporting surface on which the sheet is subjected to heat is shown as the surface 16 of a workpiece to be bonded by the adhesive, it may be a release surface such as a silicone or polytetrafluoroethylene coated surface from which the resin may be stripped after heating to give it the desired configuration and cooling to solidify it. The open pattern sheet so obtained may be assembled with surfaces to be bonded and activated to wet and adhere to those surfaces. On cooling such assembly a strong bond is obtained.

In general, thin films are converted to line patterns more readily than thicker films and when the films are over about 0.03 inch, the opening effect is not reliable.

The width of film section between cuts should not be over about three-sixteenths inch and with films of about 0.03 inch in thickness, the width should be not over about one-eighth inch. It appears important that the thickness of the film be not more than one-third, preferably considerably less than one-third the width of the space between adjacent lines or cuts. Also in an arrangement of slits or cuts it is preferred that the length of the slits or cuts be at least equal to and preferably at least three times the greatest distance between any point on the edge of a slit or cut and the closest point on the slit or cut nearest the first mentioned point.

The term "greatest distance between any point on the edge of a slit or cut and the closest point on the slit or cut nearest to the first mentioned point" may be more readily understood from the following discussion. From each point on a first slit or cut the distance can be measured to the closest point on the slit or cut nearest to the first mentioned point. The distances will be greater from some points on the first mentioned slit or cut to the slit or cut nearest to such points; and there will be one point on the slit or cut for which the distance to the closest point on the slit or cut nearest to it will be greatest. It is this greatest distance that is referred to above and in the claims by use of the quoted language.

A preferred pattern of slits or cuts for an adhesive film is shown in FIG. 1 and comprises spaced parallel lines 20 of interrupted cuts 12 with the cuts of one line 20 disposed opposite uncut portions 22 of adjacent lines 20 of interrupted cuts and with the ends of the cuts of one line overlapping the ends of the cuts of adjacent lines. Desirably the end of a cut in one line may overlap the end of a cut in an adjacent line by from about 15 to about 40 percent of the length of the cut. This arrangement is particularly satisfactory since stresses, developed in the course of shrinking of the film may be relieved by movement of the narrower portions of film between overlapping portions of the cuts of adjacent rows of cuts. As shown in FIG. 2 a reticulated pattern is formed on heating which comprises portions 24 of the lines 14 corresponding to the segments of film between the ends of cuts in a given line and portions 26 of the line 14 from the portions of film where the slits or cuts of adjacent lines overlapped, which link the portions 24 to form a network.

The open pattern of heat softened adhesive provides a uniform effective distribution of the adhesive enabling good coverage with a minimum quantity of adhesive. When a second workpiece 17 (FIG. 3) is laid down on the heat softened adhesive and the workpieces are pressed together as shown in FIG. 3 the lines 24 and 26 of adhesive establish wetting contact with the surfaces and give an excellent adhesiveness.

An alternative pattern of cuts is shown in FIG. 4 and comprises rows of spaced parallel cuts or slits 32 extending in from the opposite edges 28, 29 of a strip 30 of the adhesive sheet material 10 leaving a central uncut portion 31. As in the case of the adhesive film shown in FIG. 1 and described above, it is desired that the length of the slits 32 be at least equal to and preferably at least three times the width of the segments 34, between adjacent parallel slits and it is important that the thickness of the adhesive film or sheet 10 be not more than one-third the width of the segments 34 of adhesive film 30 between adjacent parallel slits 32. In the article shown in FIG. 4, the slits 32 are arranged at an angle other than a right angle to the direction of the strip 30 of adhesive in order to provide a greater length of the segments 34 relative to their width. On heating, the adhesive of the central uncut portion 31 of the strip forms a somewhat irregular backbone 37, as shown in FIG. 5, while the adhesive of the segments 34 forms angularly extending lines 39 somewhat in the nature of a herringbone pattern.

A further alternative form is shown in FIG. 6 in which spaced parallel lines 42 of interrupted non-cut portions 44 are disposed in a strip 40 so that the cuts 42 of one line are opposite the cuts of adjacent lines and uncut portions are opposite uncut portions. Heating such a strip results in pulling-in of the adhesive to form openings 46, as shown in FIG. 7 which have some advantage in allowing gas trapped under the film to escape. But this pattern of film does not offer the full advantage of developing lines or beads as in the forms of the adhesive sheet shown in FIGS. 1 and 4.

As the adhesive of which the sheet is formed, it is preferred to use high molecular weight thermoplastic synthetic polymer resin, for example, relatively high molecular weight polyesters, polyamides, polyesteramides and thermoplastic polyester glycol urethanes or polyether glycol urethanes. Other normally solid heat-softenable polymeric adhesive materials may be used which, either alone or in admixture, can be formed into thin, nontacky films which retract on heating, and which are capable of melting to a condition for wetting and adhering surfaces to be joined and of hardening to provide an adhesive bond.

The following examples are given to aid in understanding the invention but it is to be understood that the invention is not limited to the particular materials, dimensions or arrangements of cuts shown in the examples nor to the particular procedures or conditions employed.

EXAMPLE I

A polyamide from condensation of a mixture of 85% dimerized linoleic acid and 15 mol percent of azelaic acid with a mixture of diamines comprising 85 mol percent of ethylene diamine and 15 mol percent of hexane diamine was formed into a thin film about 0.010 inch in thickness. This polyamide had a softening point (Ball and Ring) of about 275°F. and a viscosity at 355°F. as determined with a 3/32 inch falling steel ball of from 50 to 60 seconds. Parallel cuts were made in the film in a pattern similar to that shown in FIG. 1 in which the slits were about one-half inch long and adjacent lines of slits were spaced about 3/32 inch.

A 1 inch wide strip of the material was disposed on the surface of a piece of butadiene styrene copolymer synthetic rubber shoe sole stock and was subjected to radiant heat at a distance of 2 inches for a period of 15 seconds. During the heating the film softened and shrank in from the cut edges to form a reticulated pattern of lines of molten adhesive as shown in FIG. 2. As the adhesive film shrank in, the underlying portions of shoe sole stock were exposed to the radiant heat and brought to elevated temperature for effective union with the adhesive in subsequent steps.

At the same time that the strip of stock with the adhesive film on it was subjected to heat, another piece of outsole stock was subjected to comparable heating. Directly on completion of the heating steps the strip of sole stock with the reticulated pattern of adhesive on it was pressed against the second piece of shoe sole stock to squeeze the molten adhesive and force it into wetting adhesive engagement with the surfaces of each of the pieces of soling stock. On cooling of the assembly it was found that the pieces of soling stock were held together with strength adequate for sole attaching.

EXAMPLE II

A crystallizable copolyester was prepared by condensation and polymerization of a 5.0:4.1:0.9 mol ratio mixture of terephthalic acid, isophthalic acid and dibutyl sebacate with 1,4 butane diol having a melting point of about 280°F. was formed into a 0.010 inch thick continuous film and the film was cut into strips 1 inch in width. Spaced parallel slits were cut in extending from opposite edges of the strip of adhesive sheet material. The slits were spaced about 3/16 inch apart and were exposed at an angle of about 45° to the direction of the strip leaving an uncut portion of the strip along the center about 3/16 inch wide as shown in FIG. 4.

A length of the adhesive film strip was disposed on the surface of a piece of outsole stock and was subjected to heating and assembled with a heated second section of outsole stock as in Example I. The heated sections were pressed together with the adhesive between them. In the process of heating, the adhesive shrank in from the cut edges to form lines of molten adhesive arranged in a roughly herringbone pattern as shown in FIG. 5.

After assembly and pressing together of the strips, the strips were allowed to cool. On cooling it was found that the strips were bonded together with a strength sufficient for outsole attaching on shoes.

EXAMPLE III

A thermoplastic adhesive composition was prepared comprising about 40 parts by weight of a polyterpene resin (Schenectady Resin ST 5115) having a melting point of 115°C. and understood to be a polymer of beta-pinene, 56 parts by weight of a resinous polyethylene and about 4 parts by weight of butyl rubber. This adhesive composition had a falling ball viscosity as determined at 196°C. using a 3/16 inch steel ball of from 40 to 50 seconds.

A 0.010 inch thick film was formed of this adhesive and the film was slit in the same pattern as that used in FIG. 1.

A 1 inch wide strip of the slit film was disposed on paper and subjected to radiant heat at a distance of 1 inch from the radiant heat source for 15 seconds. The adhesive shrank to form a reticulated pattern comparable to that shown in FIG. 2. When a second piece of paper was pressed against the molten adhesive on the surface of the first piece, a strong bond was formed promptly. After cooling, the pieces of paper could not be separated without destroying the paper.

Having thus described my invention what I claim as new and desire to secure by Letters Patent of the United States is:

1. A thermoplastic film or sheet product having openings forming a net-like pattern or configuration determined by laterally interspaced lines of interrupted slits or cuts with the solid portions between each line overlapped by the slits or cuts of adjacent lines and which are initially formed in unslit or uncut thermoplastic film or sheet and thereafter opened to form said openings; wherein the improvement comprises said openings being defined by net-work linking portions comprising shrunken or retracted segments of initially unshrunk or unretracted shrinkable or retractable thermoplastic film or sheet in which said slits or cuts were formed, said segments being shrunk or retracted via the solid portions of the film or sheet between said slits or cuts.

2. The product of claim 1 in which said film or sheet is in the form of a strip and said initially formed lines of slits or cuts extend longitudinally with respect to this strip, said net-like pattern or configuration comprising elongated openings oriented longitudinally with respect to said strip.

* * * * *